United States Patent [19]
Klein et al.

[11] Patent Number: 5,433,465
[45] Date of Patent: Jul. 18, 1995

[54] CABLE GUIDE FOR BICYCLE FRAMES

[75] Inventors: Gary G. Klein; Darrell W. Voss, both of Chehalis; Sean O'Connor, Rochester, all of Wash.; Lonney Pauls, Estacada, Oreg.

[73] Assignee: Klein Bicycle Corporation, Chehalis, Wash.

[21] Appl. No.: 105,740

[22] Filed: Aug. 13, 1993

Related U.S. Application Data

[63] Continuation-in-part of Ser. No. 922,610, Jul. 31, 1992.

[51] Int. Cl.⁶ .............................................. B62K 19/30
[52] U.S. Cl. .................... 280/281.1; 74/487; 74/489; 74/502.2; 74/502.4; 74/502.6
[58] Field of Search ............... 280/281.1; 74/487, 489, 74/502.2, 502.3, 502.4, 502.6

[56] References Cited

U.S. PATENT DOCUMENTS

| | | | |
|---|---|---|---|
| 4,585,246 | 4/1986 | Diekman et al. | 280/281.1 |
| 4,768,798 | 9/1988 | Reed et al. | 280/281.1 |
| 4,917,397 | 4/1990 | Chonan | 280/281.1 |

FOREIGN PATENT DOCUMENTS

| | | | |
|---|---|---|---|
| 432825 | 1/1949 | Italy | 280/281.1 |

*Primary Examiner*—Mitchell J. Hill
*Attorney, Agent, or Firm*—Jim Zegeer

[57] ABSTRACT

Improved cable guide for bicycle frames which has been found useful for improving the fatigue life of light weight bicycle frames and other stressed tubular structures. One or more welding or brazing-free dimple/bulkhead forming deformations produce strategically reduced stiffness zones so as to reduce peak stresses. The cable guide system also offers an improved method for routing control cables through the frame structure. A plastic cable nozzle insert is disclosed along with pyramid-shaped external dimples and contiguous bulkheads.

3 Claims, 6 Drawing Sheets

CABLE GUIDE FOR BICYCLE FRAMES

REFERENCE TO RELATED APPLICATION

This application is a continuation-in-part of application Ser. No. 07/922610 for "Cable Guide for Bicycle Frames and Method for Increasing Frame Strength," filed Jul. 31, 1992 pending.

INTRODUCTION

Modern, light weight, bicycle frames are developed to achieve a variety of design goals including, aesthetics, strength, stiffness, riding and handling comfort—all at the lowest weight possible. The structural capability of the frame is one of the top considerations in the frame design since the frame must handle a relatively large range of rider sizes, under an extreme variety of environmental conditions. Riding environments range from relatively smooth paved roads to rugged mountain trails. Frames designed for competition are generally pushed to the design limits many times during their lifetime.

Bicycle frames typically include a top tube (1) and down tube (2) secured (as by welding) to a head tube (3), located at the front of the frame (see FIG. 1). A seat tube (4) is secured at its upper end to the trailing end of the top tube and to a bottom bracket shell (5) at the lower end. The bottom bracket shell 5 in turn is secured to the aft end of the down tube 2, to form the front triangle of the frame. The seat tube 4 is also secured at its top to two (2) seatstay tubes 6L, 6R. The seatstay tubes 6L and 6R in turn are secured to two (2) chainstay tubes 7L, 7R via the rear drop outs 8L, 8R. The chainstay tubes 7L, 7R are secured to the bottom bracket shell 5, closing out the rear triangle of the frame. The strength of the joints in the framework are crucial to the integrity of the structure.

Probably the most critical of the joints in the frame structure are the attachment points of the top tube 1, down tube 2 and head tube 3. With the impact loadings common to modern bicycle frames, these joints are generally highly stressed and can pose a serious fatigue, yield or-fracture problem. The frame tubing material is usually very thin and can itself pose a problem from crippling and cracking under extreme loading conditions. To compound the problem, frame designers often route control cables through openings in the top tube 1 and down tube 2 walls, generally in close proximity to the head tube 3 and seat tube 4 joints. See FIGS. 2 and 3. These access points introduce stress risers that can be a serious threat to the fatigue life of the structure.

To reduce the stresses in the vicinity of the control cable access points, some frame designs use welded or brazed inserts to reinforce the hole in the tube wall. However, the weld material (usually as thick or thicker than the adjacent tube walls) can introduce an undesirable stress riser due to the local change in tube wall stiffness at the location of the weld material. In addition, the grain structure of the local tube material is generally altered during the welding process, making the material weaker than the parent material. Sometimes frame failure results from surface cracks originating from these hole reinforcement welds.

BACKGROUND AND BRIEF DESCRIPTION OF THE INVENTION

In our application Ser. No. 07/922610, we point out that, based on computer modeling and experimental testing of bicycle frames, by strategically reducing tile tube wall stiffness of certain regions within a bicycle frame, the fatigue life of the entire structure can actually be improved. This improvement can be accomplished with little or no added weight to the structure. The reason this is possible is that the peak stresses in a conventional bicycle frame tend to be very concentrated at and near the joints. By locally altering the frame structure, the magnitude of these stresses can be reduced by spreading the loads more uniformly over a larger region of the structure. The result is lower peak stresses and improved fatigue life for the frame. This provided an improved method for reinforcing the access points for cable routing in bicycle frames. In addition, the tubular frame structure exhibits improved strain energy adsorption due to the tube wall modification. The frame will deflect further under a given load, thus adsorbing more impact energy from an impact without failure. This generally improves the safety of the product. That invention redistributed stress near joints in a bicycle frame; provided improved control cable entry/exit points in a bicycle frame; provided improved control cable entry/exit points which are free of welding or brazing to produce a strategically reduced stiffness zone in the structure so as to reduce peak stresses in a bicycle frame and thereby improve the fatigue life of the frame; provided improved control cable entry/exit structures without welding or brazing and without introducing local stress risers in the structural tubing walls of the bicycle frame; provided control cable entry/exit points for tubular members which are framed to produce a bulged, curved or raised surface on the circumference of the tube; and provided an insert, preferably made of plastic or low friction material for the purposes of weather sealing control cable entry/exit apertures, reduce cable friction and improve the aesthetic appearances and appeal of the cable entry/exit structure.

THE PRESENT INVENTION

One feature of the present invention is directed to a plastic cable nozzle insert, inserted and frictionally and/or adhesively secured in a hole formed in a bulkhead formed by pushing in one part of the tube wall and pulling a contiguous portion to form the double dimple. The bulkhead is at an angle to a plane orthogonal to the tube axis so that the cable makes an acute angle entry. The cable nozzle is dimensional to partially or wholly fit in the pushed-in dimple so that it can easily be assembled into the bulkhead hole. Another feature is directed to the pyramid shape of the pulled-out portion. Another feature of the invention is directed to a single-pyramid dimple whereby the bulkhead area is smaller and a small cable exit hole allows the cable to exit at a relatively shallow angle.

BRIEF DESCRIPTION OF THE DRAWINGS:

The above and other objects, advantages and features of the invention will become more apparent when considered with the following specification and accompanying drawings wherein.

DETAILED DESCRIPTION OF THE INVENTION

To adequately describe this invention and to discuss how the invention works, it is necessary to gain some basic understanding of the structural response characteristics of a bicycle frame during loading. For this discussion refer to FIG. 2.

This discussion will concentrate on frontal impact, and panic braking loads since these conditions tend to drive the design of the front triangle of the frame. Tests have shown that for frontal type loadings, most of the deformation of the frame occurs in the front triangle. Therefore, the frame can be considered as the simplified structure shown in FIG. 2, where the aft ends of the top tube 10 and down tube 11 are fixed in space as shown and the forward ends are welded to head tube 12. The road loads are transferred to the frame structure via the front wheel, fork and head set (bearing) assemblies (not shown). These loads manifest themselves as radial loads acting on the upper and lower bearings (Fup, Flow—FIG. 2) and an axial load acting on the lower bearing. The relative magnitudes of these load components depend on the loading configuration being considered.

A number of different load paths exist to react the applied loads. The load paths that are actually active during a given loading (and the extent to which they provide structural support) are dependant on the relative stiffness of the available load paths. From a global perspective there would appear to be only two load paths in bicycle frames, the top tube and down tube. However, from a continuum point of view, the material media actually provides many load paths.

Analytical methods for evaluating structures with high degrees of redundancy have been available for many years. The more sophisticated of these methods fall into the category of finite element methods and are widely used in industry today. A brief introduction to the finite element method will be helpful, at this point in the discussion, to provide some visual insight into the structural behavior of a bicycle frame undergoing impact loading.

The finite element method breaks the material continuum of a structure into a finite number of elements (hence, the term finite element). These elements may be two or three dimensional beams, plates and shells or three dimensional solids. The deformation characteristics of these finite elements are defined in terms of the nodal displacements (nodes are the connecting points of the finite elements) and the forces externally applied to these nodes. By defining the material properties and geometry of the finite elements, the locations and magnitudes of applied forces and the boundary conditions of the structure, computer models can be constructed to evaluate the stress distribution within the material continuum.

Figure 1:
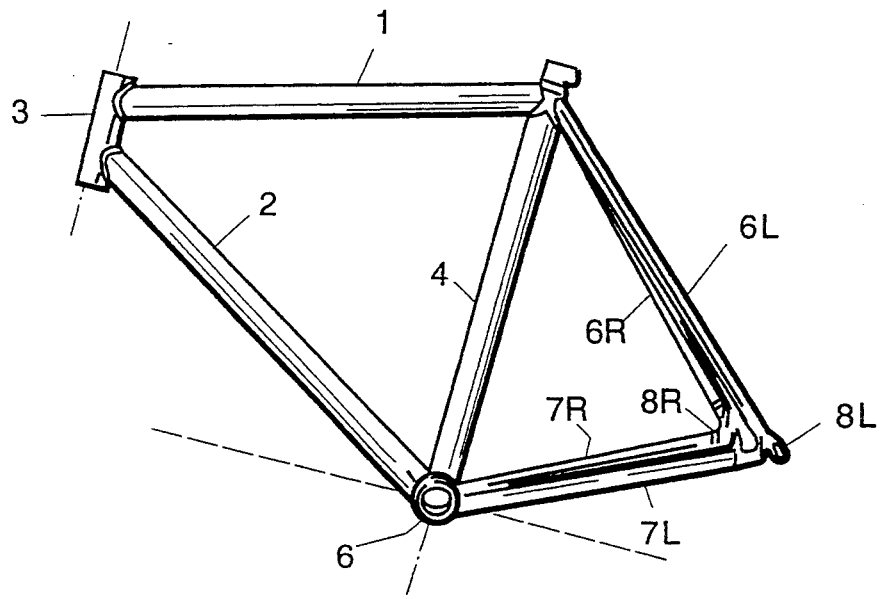
FIG. 1 is a side view of a bicycle frame.
Figure 2:
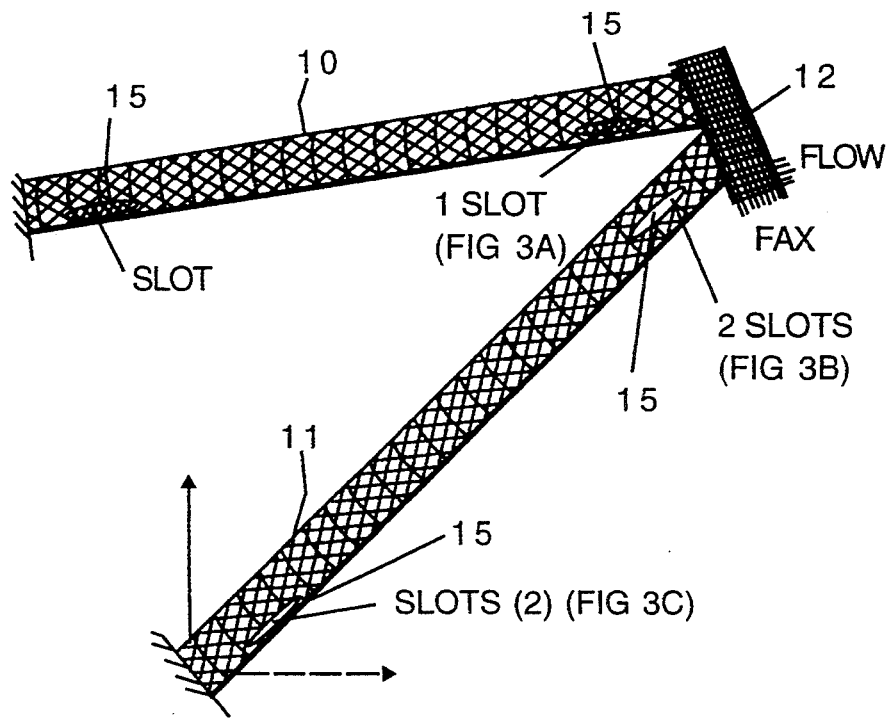
FIG. 2 is a diagrammatic side view of the bicycle frame illustrating stress lines and nodes in the head, top and down tubes with the trailing ends of the down and head tubes stationary.

In a bicycle frame, such as that illustrated in FIG. 2, the externally applied loads acting on the bearings (Fup, Flow and Fax) are transferred to the rear triangle of the frame via the head 12, top 10 and down 11 tubes. The distribution of loading between the top and down tubes, as well as the load distribution within these members, depend on the relative stiffness of the available load paths. Load paths with larger stiffness values support a greater portion of the applied load. A finite element analysis of the bicycle frame structure is shown in FIG. 2. Each line connecting the nodes in the mesh call be thought of as an alternate load path in the structure. The stiffness of these load paths are dependant on the length of the load path, a weighted average of the thickness of material along the path and the material properties. Computer analysis and/or testing is required to determine the actual distribution of loads.

The distribution of loads (hence, stresses) in the structure can be altered by changing the stiffness values of a given path or a set of paths. For example, if one were to insert a larger top tube 10 in the structure in FIG. 2, one would, in effect, increase the stiffness of the load paths passing through the top tube. This will cause the top tube 10 to support a larger portion of the applied load and reduce the load on the down tube 11. The converse is also true. One can provide relief to the top tube 10 by increasing the stiffness of the down tube 11.

Figure 3A:
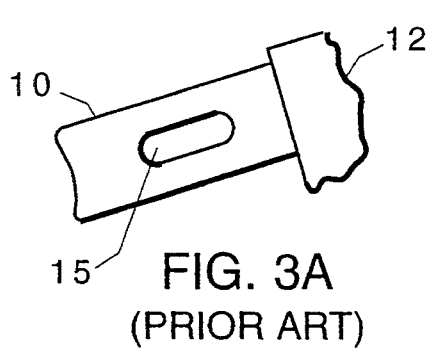
FIGS. 3A, 3B and 3C illustrate prior art slotted hole cable guideways.
Figure 3B:
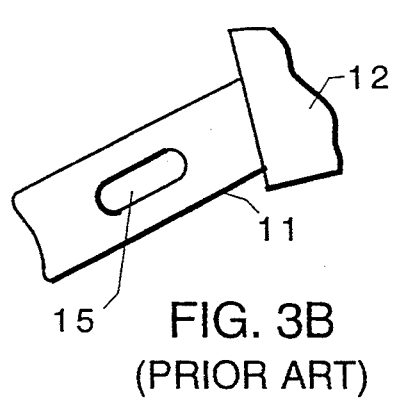
Figure 3C:
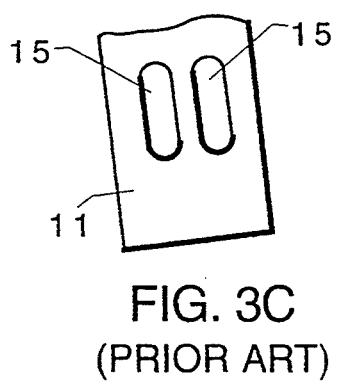

On a much smaller scale, peak stresses within a tube can be altered by locally effecting the stiffness of the tube structure. This can be done by adding or removing material. For example, on frames made with welded reinforcements around the cable entry and exit holes, actual reductions in the overall strength of the tube have been observed. Research indicates that this is due to an increase in the local stiffness by the weld material. This increase tends to concentrate the loads in the region of the entry and exit holes which is not a desirable situation. Further research has shown that by removing material in the region of the cable access hole (by introducing an open slot as shown in FIG. 2), peak stresses in that region are reduced by approximately 10 percent (for panic braking and frontal impact loads) over a solid (unslotted) cylindrical tube. FEA (finite element analysis) studies show that this is accomplished by redistributing loads between the top and down tube and within the down tube itself. FIGS. 3A, 3B and 3C illustrate the slot geometry that was used in this analysis and work. Slots 15 in the top and down tubes near the head tube (FIGS. 3A and 3B) and on the down tube near the bottom bracket (FIG. 3C) were evaluated. Actual laboratory tests support analytical findings showing life cycles considerably higher than frames without the slots.

However, further FEA modeling work revealed some severe limitations of the slot design, especially for torsional type loadings (e.g. rim side impacts and handle-bar torsional loading). Under these conditions, the corners of the slot itself become severely stressed due to shear distortion of the free edge of the slot. This finding led to an improved design. This is referred herein as the "dimpled" design/since the region is formed by dimpling the tube surface to form the cable access points. This invention minimizes the distortion in the slot by introducing a smoothly bulged material surface to replace the slot opening. This invention still offers ample flexibility in the circumferential (hoop) direction of the tube to redistribute the local peak stresses. It also provides shear resistance from the bulged surface of material.

Figure 4A:
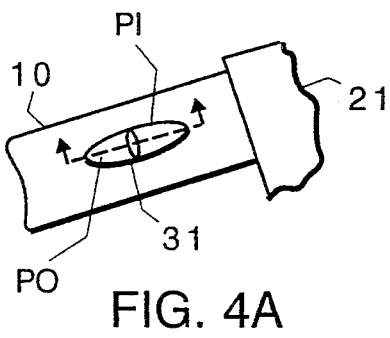
FIGS. 4A, 4B and 4C illustrate double dimple cable guideways according to the invention, and FIG. 4AA is an enlarged sectional view through lines AA of FIG. 4a, FIG. 5 is a sectional view of a double dimple cable guide and cable assembly according to the invention.
Figure 4B:
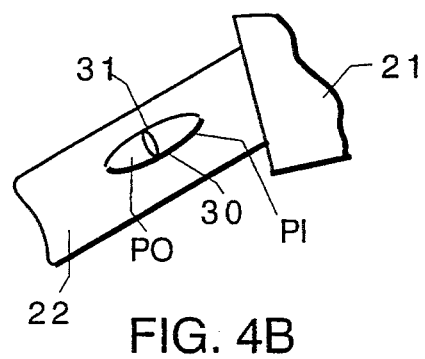
Figure 4C:
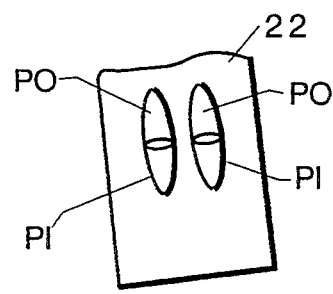
Figure 4A:
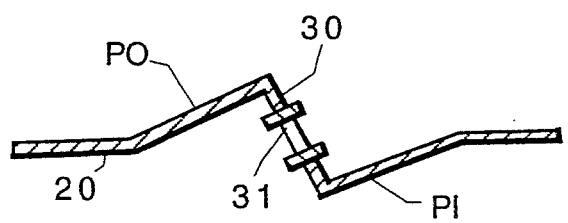
Figure 5:
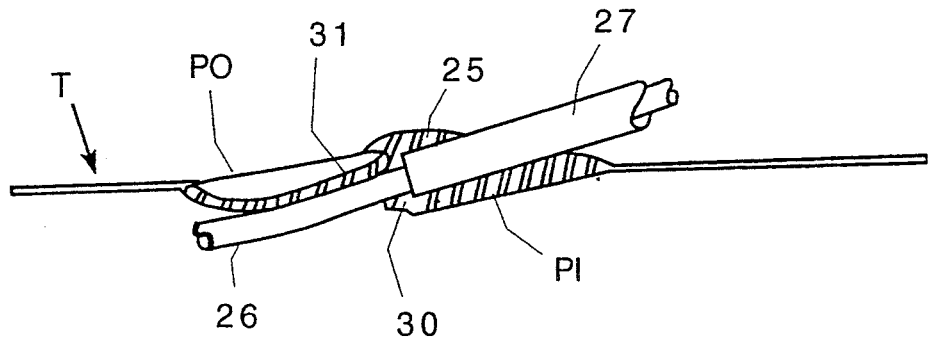

FIGS. 4 and 5 illustrate preferred embodiments of the invention, the dimensions are merely exemplary. The dimple configuration of this invention is unique in that it is actually a "double-dimple", created by pushing in one part PI and pulling out the other part PO (see FIG. 5). Prior art dimpling has been done in the past by making a hole in, the tube and then using a single push-in process. According to this invention, an access hole is made subsequent to the dimple formation. The double-dimple process according to this invention forms a "bulkhead" 30 in the middle between dimple pull out PO and dimple push in PI, the bulkhead making an angle ($\alpha$) of 45–90 degrees with the tube axis CL. The push-in PI and pull-out PO portion of the dimple are oriented such that the bulkhead faces in the direction of the control cable so that the control cable approaches the tube at a relatively shallow angle. The access hole or aperture 31 is formed into bulkhead 30.

Figure 6:
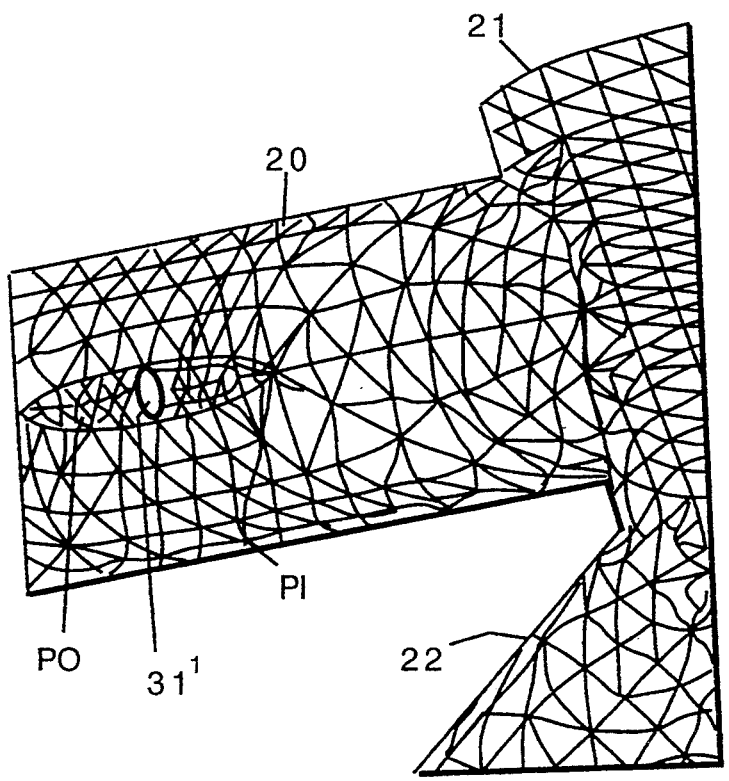
FIG. 6 illustrates stress analysis of a double dimple cable guide according to the invention in the top tube.
Figure 7:
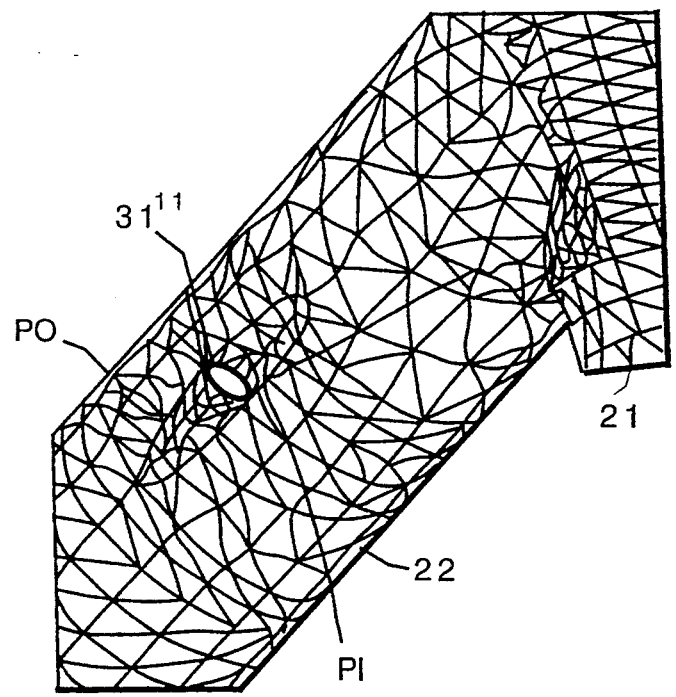
FIG. 7 illustrates stress analysis of a double dimple cable guide incorporating the invention in the down tube near the head tube.
Figure 8:
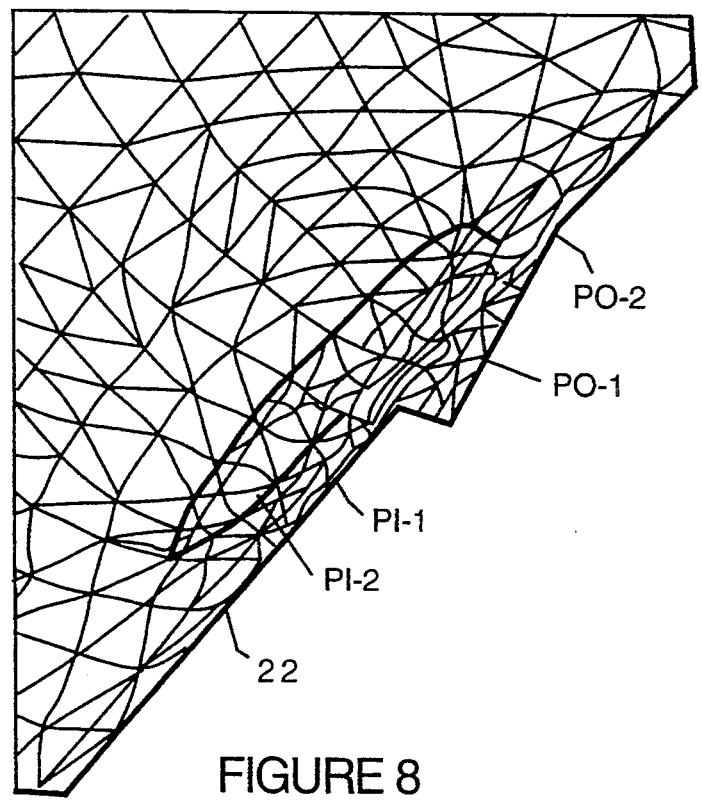
FIG. 8 illustrates stress analysis of a double dimple cable guide in a down tube near the bottom bracket.

Finite Element Analysis (FEA) of double-dimple design according to this invention shows equal or superior performance, compared to the slotted, unslotted, and welded designs, for all loading conditions considered (including the torsional loads). FIGS. 6, 7 and 8 are zoom-in views of the FEA model used for the evaluation. FIGS. 9A and 9B show the FEA results for the frontal impact case.

A FEA study was made to compare the dimpled design to a simple design consisting of a circular hole ($\frac{3}{8}$" diameter). The circular hole design (not necessarily $\frac{3}{8}$" diameter) has been used for some frame designs previously. The circular hole gave results intermediate between those of the slot and the unmodified tube. The results of all the FEA studies indicate far superior performance for the dimple feature of this invention. Stress reductions of 17 to 82 percent were indicated for the double-dimple design (in the region of the opening). The range of values depends on the loading condition and the location of the dimple within the frame.

In FIGS. 4A and 4AA, top tube 20 is welded to head tube 21 and the push-in dimple portion P1, as an example, begins about 2 inches from the centerline of head tube 21, push-in portion P1 and pull-out portion P0 have angles of 11 degrees and are about $\frac{3}{4}$" long and 5/16" at their widest and a 3/16" cable access hole 31 is formed in bulkhead 30. The FEA model is depicted in FIGS. 6, 7, and 8. FIGS. 4B and FIG. 7 illustrate the double-dimple cable access on the down tube near the head tube. FIGS. 4C and 8 illustrate side-by-side pairs of dimpled cable access exits at the aft end of the down tube near the bottom bracket.

As an enhancement to the design, a plastic close-out insert 25 may be provided, as shown in FIG. 5. The insert not only enhances the aesthetics of the design but also provides a low friction surface for the cable 26 to slide on and provides a weather seal for the tubing T. It can also be designed to provide a positive lock, clamp or threading for the cable housing 27 to prevent chattering during normal use.

Figure 9D:
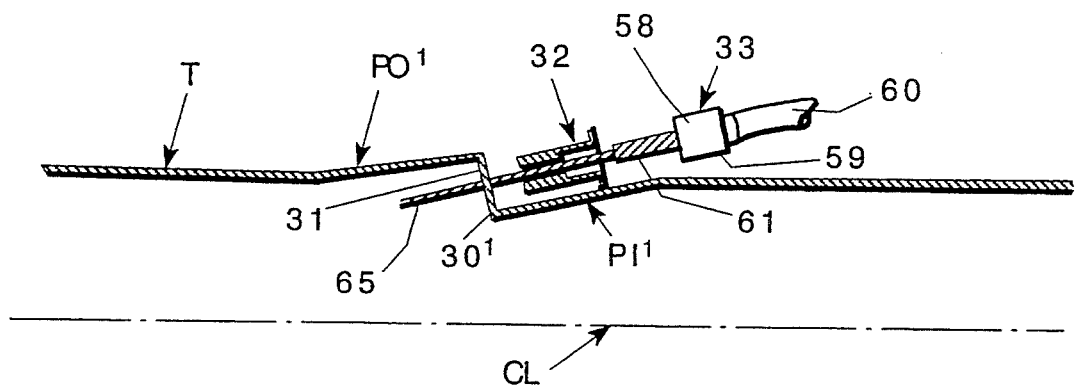
FIG. 9D is an assembly view showing the plastic cable nozzle insert and its relation to the bulkhead aperture and a threaded cable of ferrule.
Figure 9C:
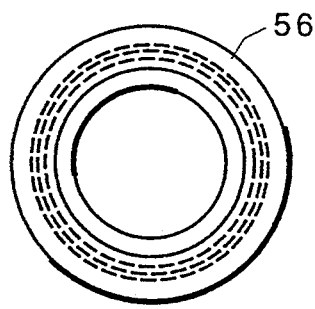
FIG. 9C is a top plan view.
Figure 9A:
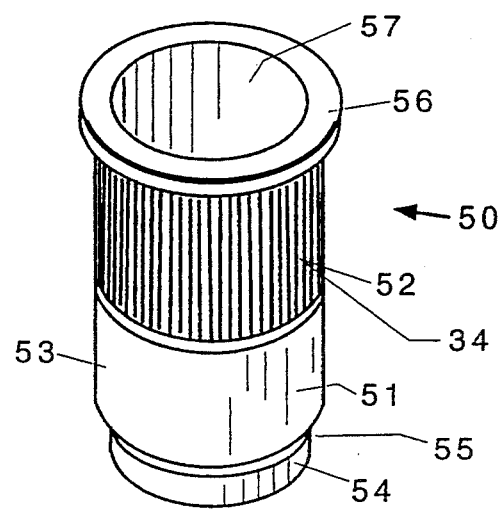
FIG. 9A is a perspective view of a plastic cable nozzle insert, according to the invention.
Figure 9B:
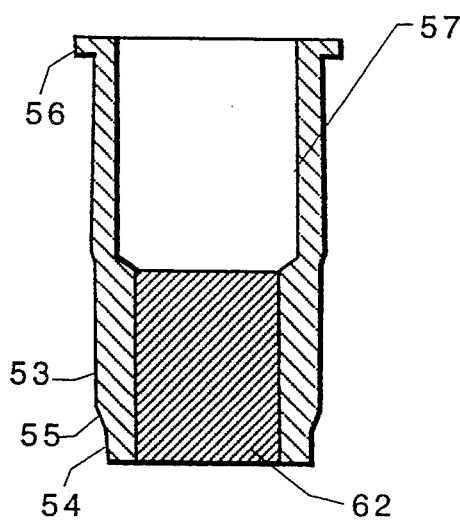
FIG. 9B is a sectional view thereof.

FIGS. 9A–9D illustrates one preferred embodiment of the cable entrance dimple design, according to this invention. The dimple configuration is actually a "double-dimple," created by pushing in one part PI' and pulling (or pushing) out the other part PO'. The double-dimple process forms a "bulkhead" 40 in the middle between dimple pull-out PO' and dimple push-in PI', the bulkhead making an angle between about 45–90 degrees with the tube axis CL. The push-in PI' and pull-out PO' portion of the dimple are oriented such that the bulkhead faces in the direction of the control cable so that the control cable approaches the tube at a relatively shallow angle. An access hole or aperture 41 is formed into bulkhead 40 to accommodate a plastic cable nozzle insert 50. Details of the plastic cable nozzle insert 50 are shown in FIGS. 9A, 9B, and 9C.

Figure 10A:
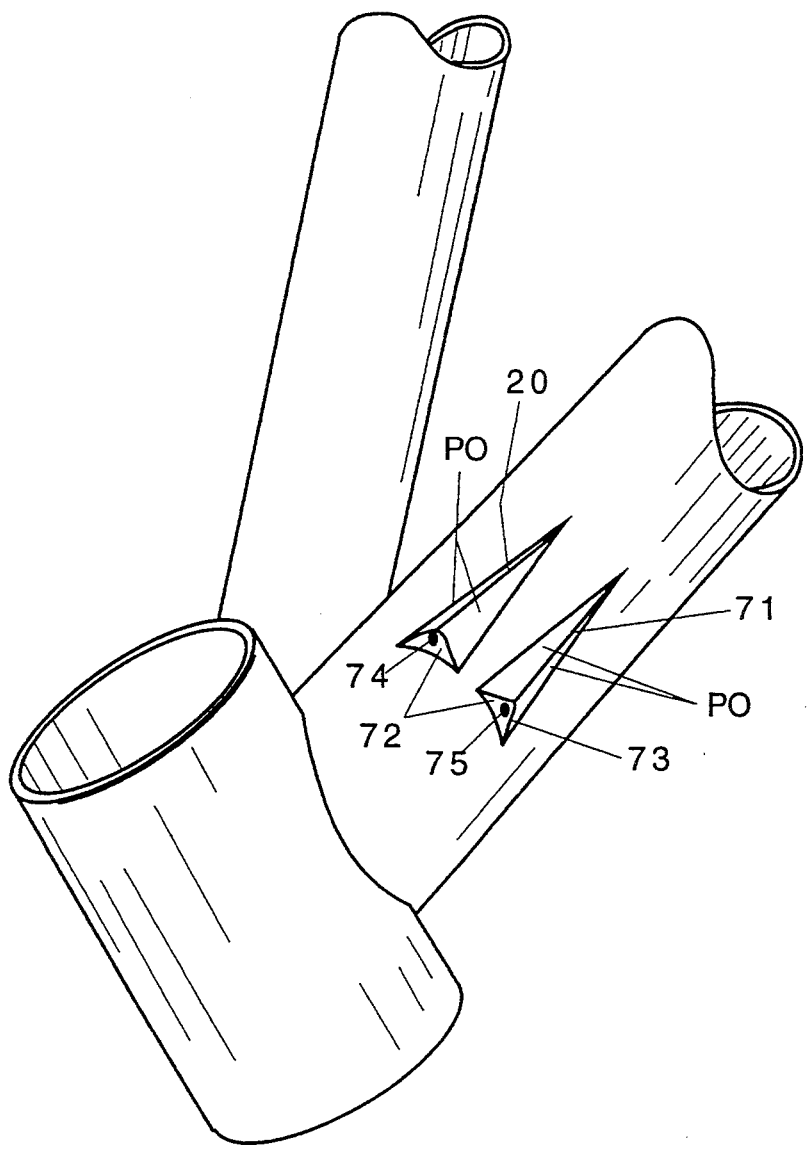
FIG. 10A is a perspective view of two single pyramid dimples with small cable holes in the bulkheads thereof.
Figure 10B:
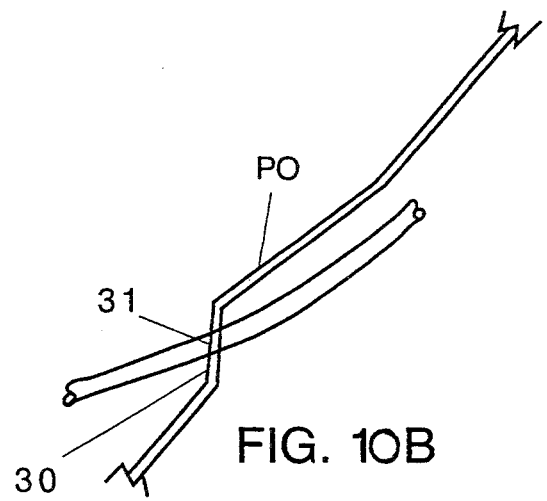
FIG. 10B is a sectional view of the lines A-A of FIG. 10B.

Referring to FIGS. 10A, 10B, and 10C, plastic cable nozzle insert 50 has a cylindrical body 51 with a diameter adapted to fit in aperture or hole 31' in bulkhead 30', having teeth or serrations 52 formed thereon so that as end 53 is pressed into hole 31'; the teeth serrations deflect relative to the edges of hole 31 to frictionally retain plastic cable nozzle insert 50 in the hole. An adhesive can be used to make a more secure connection. Note that the lower end 53 has a reduced diameter 54 and a conical portion 55 to facilitate installation. Exemplary dimensions are shown on FIGS. 10B and 10C. A stop flange 56 which seats flush against bulkhead 30' when installed is integrally formed on the body and contiguous to the end of teeth or serrations 52.

The internal surface portion 57 is adapted and dimensioned to form a chamber to receive shank 58 of cable ferrule 59 on the end of cable 60. The end 61 of ferrule 59 is threaded and is threadably received by threaded bore 62 in plastic cable nozzle insert 50. Control cable 65 is thus operably installed.

This cable nozzle and double dimple has the advantage of simplicity and reduced cost compared to the plastic insert design disclosed earlier herein.

FIGS. 10A and 10B illustrate a further preferred embodiment of the control cable exit dimple design. The dimple configuration 70, 71 are single-pyramid-dimples, created by pulling out the part A to form the pyramid-type geometry. The dimple process forms bulkhead 72,73 making an angle ($\alpha$) of between about 45–90 degrees with the tube axis CL. Small exit holes 74,75 are formed to the bulkheads to allow the cable to exit the tube. The pull-out portion of the dimple 70, 71 oriented such that the exit holes, 74, 75, located on the bulkhead, and allows the central cable to exit the tube at a relatively shallow angle.

The invention accomplishes the function of routing cables through a highly stressed tube section, which may be near a tubing joint, without adding additional weight. In addition, the invention accomplishes a substantial increase in the fatigue strength of the tubing structure, in all expected loading modes, by altering the load paths of the structure. The method needs only a simple forming operation, which is much less costly to produce than the prior welding method used. The dimpling operation can also be used even where no cable needs to be placed, in order to increase the strength and durability of the frame.

While preferred embodiments of the invention have been shown and described, it will be appreciated that various modifications and adaptations of the invention will be readily apparent to those skilled in the art and embody the spirit and scope of the invention.

What is claimed is:

1. A cable guideway in a tubular metal bicycle frame member constructed without welding and brazing, said tubular metal bicycle frame member having an axial center, comprising at least one dimple in said tubular metal bicycle frame member, said dimple being integral with said tubular metal bicycle frame member and having a first wall and a first end wall, said first end wall being sharply deformed at an angle ($\alpha$) between 45 and 90 degrees and transverse of a line through the axial center of said tubular metal bicycle frame member, a cable access hole formed only in said first end wall, a plastic cable nozzle in said cable access hole, means retaining said plastic cable nozzle in said hole, and an internally threaded bore formed in said plastic cable nozzle to threadably receive a threaded cable ferrule.

2. The cable guideway defined in claim 1 wherein said plastic cable nozzle has a chamber adapted to receive the shank of a cable ferrule.

3. A cable guideway in a tubular metal bicycle frame member constructed without welding and brazing, said tubular metal bicycle frame member having an axial center, comprising:

at least one dimple in said tubular metal bicycle frame member, said dimple being integral with said tubular metal bicycle frame member and having a first wall, first end wall, said first end wall being sharply deformed at an angle ($\alpha$) between 45 and 90 degrees and transverse of a line through the axial center of said tubular metal bicycle frame member, a cable access hole formed only in said first end wall, said first wall having a pyramid shape.

* * * * *